United States Patent
LeMarquand et al.

(10) Patent No.: US 10,944,773 B2
(45) Date of Patent: Mar. 9, 2021

(54) MONITORING NETWORK ACTIVITY

(71) Applicant: BlackBerry Limited, Waterloo (CA)

(72) Inventors: Paul Wilson LeMarquand, Ottawa (CA); Kristian Neil Spriggs, Ottawa (CA); David Brian Seel, Ottawa (CA)

(73) Assignee: BlackBerry Limited, Waterloo (CA)

( * ) Notice: Subject to any disclaimer, the term of this patent is extended or adjusted under 35 U.S.C. 154(b) by 154 days.

(21) Appl. No.: 16/210,596

(22) Filed: Dec. 5, 2018

(65) Prior Publication Data

US 2020/0186555 A1    Jun. 11, 2020

(51) Int. Cl.
*H04L 12/26* (2006.01)
*H04L 29/06* (2006.01)
*H04L 12/24* (2006.01)
*G06N 20/20* (2019.01)
*G06N 20/00* (2019.01)

(52) U.S. Cl.
CPC ......... *H04L 63/1425* (2013.01); *G06N 20/00* (2019.01); *H04L 41/142* (2013.01); *H04L 41/145* (2013.01); *H04L 43/04* (2013.01); *H04L 43/16* (2013.01); *H04L 63/0236* (2013.01); *H04L 63/1441* (2013.01)

(58) Field of Classification Search
CPC ... H04L 63/1425; H04L 41/142; H04L 43/04; G06N 20/20
USPC ........................ 726/22, 23, 24, 25
See application file for complete search history.

(56) References Cited

U.S. PATENT DOCUMENTS

| | | | |
|---|---|---|---|
| 8,402,543 B1 | 3/2013 | Ranjan et al. | |
| 8,554,703 B1 | 10/2013 | Lin et al. | |
| 10,063,575 B2* | 8/2018 | Vasseur | G06N 20/00 |
| 10,063,615 B2* | 8/2018 | Panzer | G06F 16/9574 |
| 2012/0158626 A1 | 6/2012 | Zhu et al. | |
| 2017/0099310 A1 | 4/2017 | Di Pietro et al. | |
| 2017/0104774 A1 | 4/2017 | Vasseur et al. | |
| 2017/0134412 A1 | 5/2017 | Cheng et al. | |
| 2017/0244737 A1* | 8/2017 | Kuperman | G06N 3/04 |
| 2018/0159871 A1 | 6/2018 | Komashinskiy et al. | |
| 2019/0014133 A1* | 1/2019 | David | H04L 63/1416 |

FOREIGN PATENT DOCUMENTS

EP    3223487    9/2017

OTHER PUBLICATIONS

MLP: An Effective Machine Learning-Based Approach for Malware Detection https://www.sophos.com/en-us/medialibrary/PDFs/technical-papers/sophos-black-hat-2018-technicalpaper.pdf (Year: 2018).*

(Continued)

*Primary Examiner* — Randy A Scott
(74) *Attorney, Agent, or Firm* — Fish & Richardson P.C.

(57) ABSTRACT

A method for monitoring network activity includes initiating a training phase by a machine learning (ML) server. Data associated with normal network traffic through the ML server during the training phase is collected. A classification model is generated based on the collected data. The ML server switches the training phase to an active phase. An outbound request is received during the active phase. Whether the outbound request is an anomalous request is determined based on the classification model.

19 Claims, 4 Drawing Sheets

(56) References Cited

OTHER PUBLICATIONS

Pham et al., "Machine Learning Techniques for Web Intrusion Detection—A comparison" 2016 Eighth International Conference on Knowledge and Systems Engineering, IEEE, Oct. 6, 2016, 7 pages.
Extended European Search Report issued in European Application No. 19213329.6 dated Apr. 21, 2020, 8 pages.

* cited by examiner

MONITORING NETWORK ACTIVITY

TECHNICAL FIELD

The present disclosure relates to modelling network or system log activity using machine learning methods to detect intrusions.

BACKGROUND

In some cases, software tools, such as firewalls, are used to limit outbound access to prevent malicious attacks to a network system. However, these software tools may not be able to prevent attacks generated by using ports that valid processes of the network system use to communicate with the world.

DESCRIPTION OF DRAWINGS

Like reference numbers and designations in the various drawings indicate like elements.

DETAILED DESCRIPTION

Figure 1:
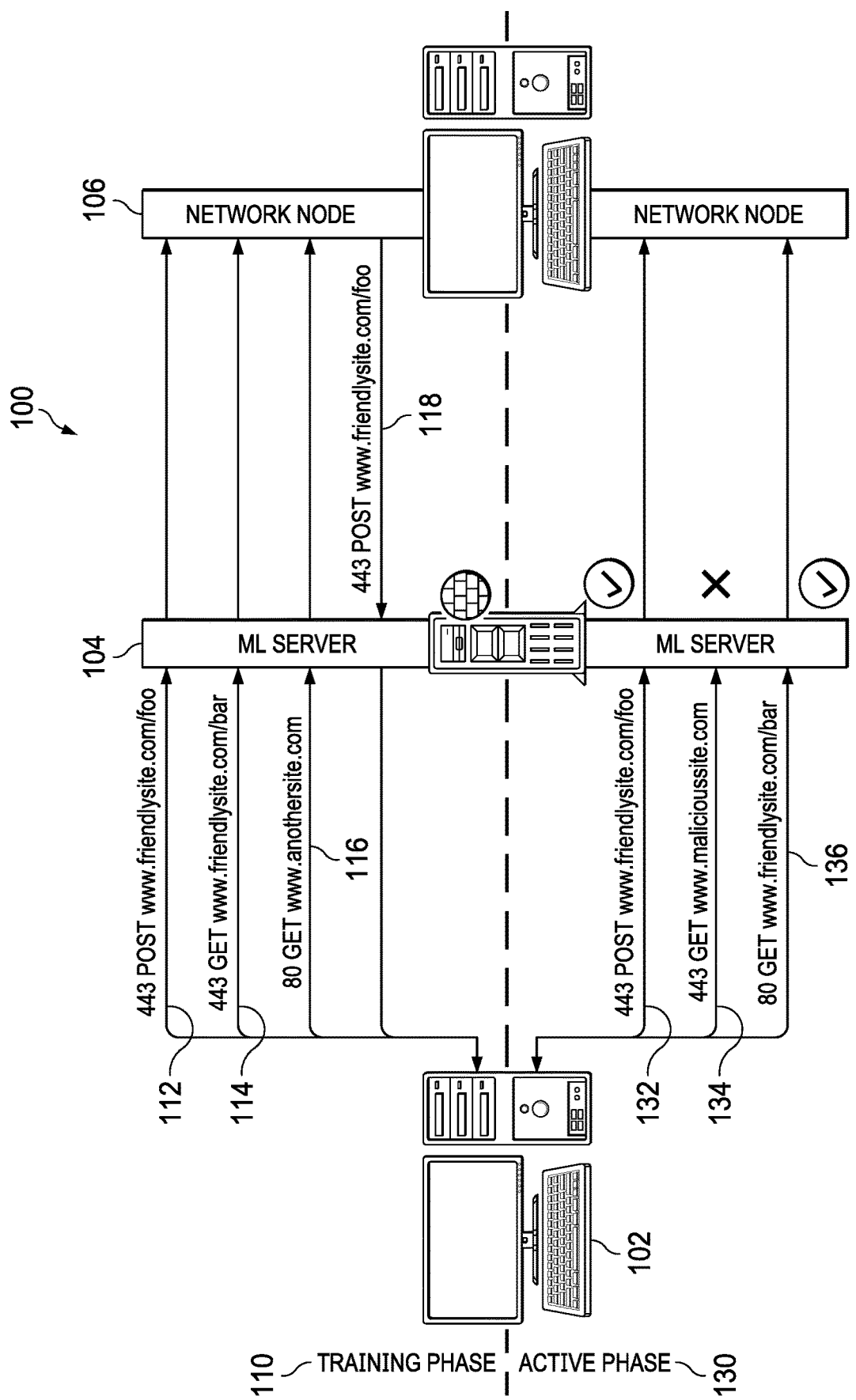
FIG. 1 is a flow diagram illustrating an example process for monitoring network activity, according to an implementation.

Software tools, such as firewalls, are used to limit outbound access to prevent malicious attacks to a network system. However, these software tools may not be able to prevent attacks generated by using ports that valid processes of the network system use to communicate with the world. In some cases, once the network system is compromised, it is important to limit the damage. The faster the network system being compromised can be detected, the less damage can be done to the network system.

At a high level, the described approach generates a classification model using machine learning methods for monitoring network or system log activity. To prevent malicious attacks or to detect when systems get compromised, the described approach models normal network traffic on open ports or normal system logs on a running system. The generated classification model can be run against real time network traffic or real time system logs to detect anomalous activity.

In some implementations, normal network traffic on open ports can be collected and modelled using machine learning methods. The model of normal network traffic can be used to monitor real time network traffic to detect anomalous requests. For example, during an initial training phase, the network system operates with normal network traffic (i.e., no anomalous network traffic). A machine learning (ML) server can monitor all outbound/inbound requests as well as the contents of those requests. The information can be used to build up a classification model (e.g., a binary classification model) representing normal network traffic. Once the network system switches to an active phase, the classification model can be used to classify real time outbound/inbound requests. For example, a confidence value can be produced for an outbound/inbound request. The confidence value indicates how certain the network system is about the outbound/inbound request being an anomalous request. Based on the confidence value, the ML server can determine whether the outbound/inbound request is an anomalous request, and take appropriate actions (e.g., raising an alert, blocking the request). The network system can be switched back to the training phase (e.g., after a software update) to retrain the model to improve accuracy.

In some implementations, system logs (e.g., syslog) can provide insights about what actions are being performed on a system. As a result, normal system logs can be collected and modelled using machine learning methods. The model of normal system logs can be used to monitor real time system logs to detect anomalous activity (e.g., whether the system has been compromised). For example, during an initial training phase, the system operates with normal system log activity (i.e., the system is not compromised). The ML server can monitor system log messages as well as the contents of those messages. The information can be used to build up a classification model (e.g., a binary classification model) representing normal system log activity. Once the system switches to an active phase, the classification model can be used to classify real time system log messages. For example, a confidence value can be produced for a system log message. The confidence value indicates how certain the system is about the system log message being an anomalous message. Based on the confidence value, the ML server can determine whether the system log message is an anomalous message, and take appropriate actions (e.g., raising an alert, taking the system offline). The system can be switched back to the training phase (e.g., after a software update) to retrain the model to improve accuracy.

Turning to the illustrated embodiment, FIG. 1 is a flow diagram illustrating an example process 100 for monitoring network activity, according to an implementation. For clarity of presentation, the description that follows generally describes process 100 in the context of the other figures in this description. However, it will be understood that process 100 may be performed, for example, by any suitable system, environment, software, and hardware, or a combination of systems, environments, software, and hardware, as appropriate. For example, process 100 can be performed by the example computer system 400 illustrated in FIG. 4. In some implementations, some steps of process 100 can be run in parallel, in combination, in loops, or in any order.

As illustrated in FIG. 1, a network device 102 in a network system is connected to a network node 106 outside the network system through a machine learning (ML) server 104. For example, the illustrated ML server 104 can monitor, on open ports of the network system, outbound requests from the network device 102 to the network node 106, and inbound requests from the network node 106 to the network device 102. Although illustrated as the ML server 104 in FIG. 1, a software running on any hardware or virtual machine may be used according to particular needs, desires, or particular implementations of the network system. Specifically, the ML server 104 executes the algorithms and operations described in the illustrated figures, including the operations performing the functionality associated with the ML server 104 generally, as well as the various software modules, including the functionality for sending communications to and receiving transmissions from the network device 102 and the network node 106.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As used in the present disclosure, the term "computer" is intended to encompass any suitable processing device. For example, the network device 102, the ML server 104, and the network node 106 may be any computer or processing device such as, for example, a blade server, general-purpose personal computer (PC), Mac®, workstation, UNIX-based workstation, or any other suitable device. Moreover, the present disclosure contemplates computers other than general-purpose computers, as well as computers without conventional operating systems. Further, the illustrated network device 102, ML server 104, and network node 106 may each be adapted to execute any operating system, including Linux, UNIX, Windows, Mac OS®, Java™ Android™, or iOS. According to one implementation, the illustrated systems may also include, or be communicably coupled with, a communication server, an e-mail server, a web server, a caching server, a streaming data server, and/or other suitable server or computer.

As illustrated, the process 100 includes a training phase 110 and an active phase 130. In some implementations, the process 100 may include additional and/or different phases not shown in the flow diagram. The ML server 104 can switch the network system between the training phase 110 and the active phase 130. During the training phase 110, it is assumed that only normal network traffic (i.e., no anomalous network traffic) passes through the ML server 104. For example, the network system can be controlled to run in a safe environment during the training phase 110. Outbound requests 112, 114, and 116 are from the network device 102 to the network node 106. Inbound request 118 is from the network node 106 to the network device 102. The outbound requests 112, 114, and 116, and the inbound request 118 are considered by the ML server 104 as normal requests. The ML server 104 can collect information about the outbound/inbound requests. For example, contents of the outbound request 116 (i.e., 80 GET www.anothersite.com) can be collected by the ML server 104 to build a classification model (e.g., a binary classification model) representing normal outbound requests. In some implementations, in addition to the high level metadata of requests (such as, the port, http method, and Universal Resource Locator (URL)), deep packet inspection can be used to model the type of data moving through the network. Similarly, contents of the inbound request 118 (i.e., 443 POST www.friendlysite.com/foo) can be collected by the ML server 104 to build a classification model (e.g., a binary classification model) representing normal inbound requests. The ML server 104 can build a single classification model representing both normal outbound requests and normal inbound requests. In some cases, the ML server 104 can build two classification models, one for normal outbound requests and the other for normal inbound requests.

After the classification model has been built, the ML server 104 can switch the network system from the training phase 110 to the active phase 130. During the active phase 130, real time outbound/inbound requests can be monitored by the ML server 104 based on the classification model. In some implementations, the ML server 104 can classify real time outbound requests 132, 134, and 136 based on the classification model. For example, the ML server 104 determines that contents of the outbound request 132 (i.e., 443 POST www.friendlysite.com/foo) matches one entry in the classification model, and as a result considers the outbound request 132 as a normal outbound request. Similarly, the ML server 104 determines that contents of the outbound request 136 (i.e., 80 GET www.anothersite.com) matches one entry in the classification model, and as a result considers the outbound request 136 as a normal outbound request. However, the ML server 104 determines that contents of the outbound request 134 (i.e., 443 GET www.malicioussite.com) does not match any entry in the classification model, and as a result considers the outbound request 134 as an anomalous outbound request.

For normal requests, the ML server 104 can simply pass the normal requests without performing other processing operations. For example, the outbound requests 132 and 136 are passed to the network node 106 outside the network system. For anomalous requests, the ML server 104 can generate an alert indicating that an anomalous request has been detected, and block the anomalous request. For example, the outbound request 134 is blocked and will not be passed to the network node 106 outside the network system.

In some implementations, the classification model can be retrained. For example, after a software update is completed in the network system, the ML server 104 can switch the network system from the active phase 130 to the training phase 110. In doing so, normal requests made by the updated software can be learned and put into the updated model, thereby improving accuracy when monitoring real time requests made by the updated software during the active phase 130.

Figure 2:
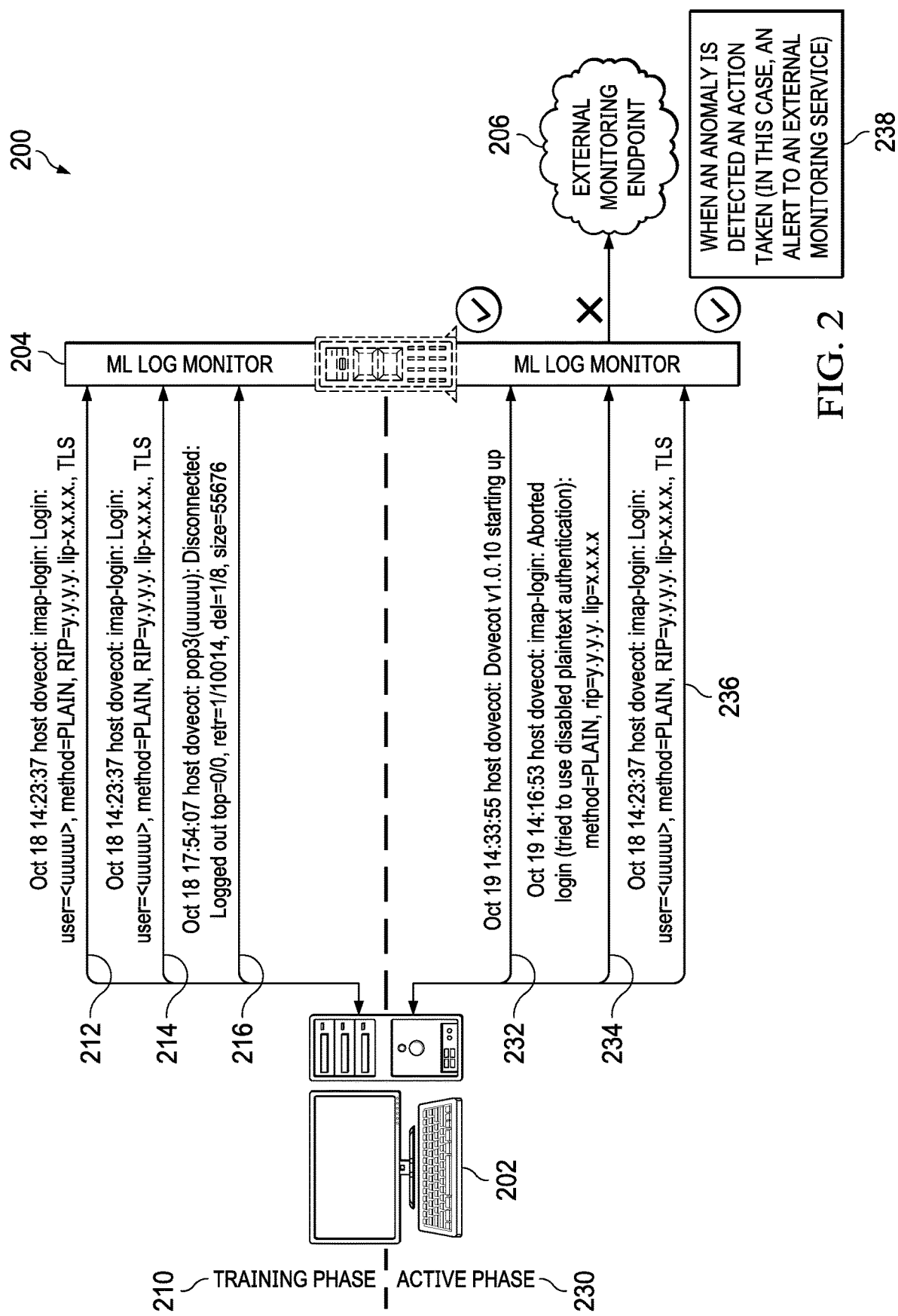
FIG. 2 is a flow diagram illustrating an example process for monitoring system log activity, according to an implementation.

FIG. 2 is a flow diagram illustrating an example process 200 for monitoring system log activity, according to an implementation. For clarity of presentation, the description that follows generally describes process 200 in the context of the other figures in this description. However, it will be understood that process 200 may be performed, for example, by any suitable system, environment, software, and hardware, or a combination of systems, environments, software, and hardware, as appropriate. In some implementations, various steps of process 200 can be run in parallel, in combination, in loops, or in any order.

As illustrated in FIG. 2, a device 202 in a system is connected to an external monitoring endpoint 206 (e.g., a network node outside the system) through a machine learning (ML) log monitor 204. For example, the illustrated ML log monitor 204 can monitor system log activity from the device 202 and report any anomalous activity to the external monitoring endpoint 206. Although illustrated as the ML log monitor 204 in FIG. 2, a software running on any hardware or virtual machine may be used according to particular needs, desires, or particular implementations of the network system. Specifically, the ML log monitor 204 executes the algorithms and operations described in the illustrated figures, including the operations performing the functionality associated with the ML log monitor 204 generally, as well as the various software modules, including the functionality for sending communications to the external monitoring endpoint 206 and receiving transmissions from the device 202.

As illustrated, the process 200 includes a training phase 210 and an active phase 230. In some implementations, the process 200 may include additional and/or different phases not shown in the flow diagram. The ML log monitor 204 can switch the system between the training phase 210 and the active phase 230. During the training phase 210, it is assumed that only system log activity (i.e., no anomalous system log activity) passes through the ML log monitor 204. For example, the system can be controlled to run in a safe environment during the training phase 210. System log activities 212, 214, and 216 are considered by the ML log monitor 204 as normal log activities. The ML log monitor 204 can collect information about the system log activities. For example, contents of the system log activities 212, 214, and 216 can be collected by the ML log monitor 204 to build a classification model (e.g., a binary classification model) representing normal log activities.

After the classification model has been built, the ML log monitor 204 can switch the system from the training phase 210 to the active phase 230. During the active phase 230, real time system log activities can be monitored by the ML log monitor 204 based on the classification model. In some implementations, the ML log monitor 204 can classify real time system log activities 232, 234, and 236 based on the classification model. For example, the ML log monitor 204 determines that all fields of the system log activity 232 match one or more fields in the classification model, and as a result considers the system log activity 232 as a normal system log activity. Similarly, the ML log monitor 204 determines that all fields of the system log activity 236 match one or more fields in the classification model, and as a result considers the system log activity 236 as a normal system log activity. However, the ML log monitor 204 determines that one or more fields of the system log activity 234 do not match any field in the classification model, and as a result considers the system log activity 234 as an anomalous system log activity.

For normal system log activities, the ML log monitor 204 can simply log the normal activities without performing other processing operations. For example, the system log activities 232 and 236 are logged by the ML log monitor 204. For anomalous system log activities, the ML log monitor 204 can generate an alert indicating that an anomalous system log activity has been detected, take the system offline to prevent further damage to the system, or both. For example, at 238, the anomalous system log activity 234 can be reported to the external monitoring endpoint 206. The external monitoring endpoint 206 can issue a command to a controller (e.g., the ML log monitor 204) of the system to take the system offline to prevent further damage to the system. In doing so, ongoing data exfiltration and any subsequent anomalous attempts can be stopped until the intrusion can be properly investigated and remediated.

In some implementations, the classification model can be retrained. For example, after a software update is completed in the system, the ML log monitor 204 can switch the system from the active phase 230 to the training phase 210. In doing so, normal system log activities made by the updated software can be learned and put into the updated model, thereby improving accuracy when monitoring real time system log activities made by the updated software during the active phase 230.

Figure 3:
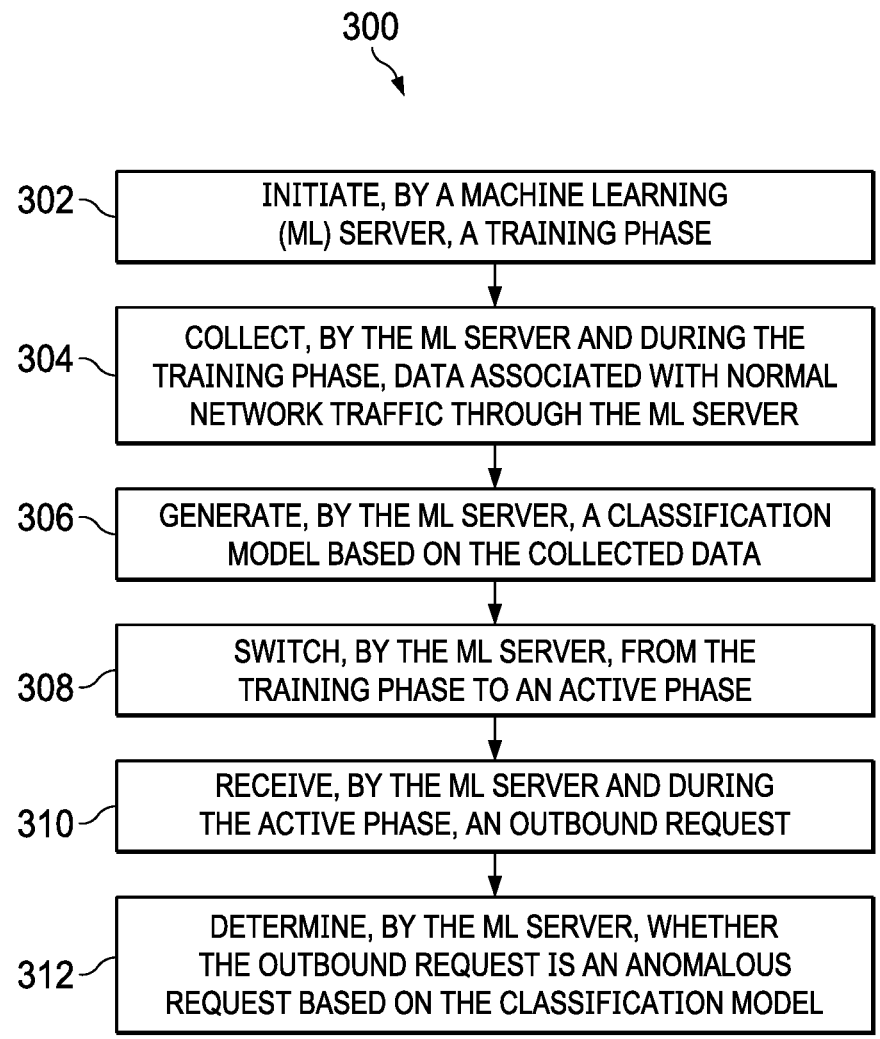
FIG. 3 is a flow diagram illustrating an example method for monitoring network activity, according to an implementation.

FIG. 3 is a flow diagram illustrating an example method 300 for monitoring network activity, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. For example, method 300 can be performed by the ML server 104 illustrated in FIG. 1, the ML log monitor 204 illustrated in FIG. 2, and the example computer system 400 illustrated in FIG. 4. In some implementations, various steps of method 300 can be run in parallel, in combination, in loops, or in any order. In some implementations, steps can also be omitted from method 300.

At 302, a training phase is initiated by a machine learning (ML) server. For example, in a network system, one or more network devices can communicate with one or more network nodes outside the network system through the ML server. The network system can be a local area network (e.g., an enterprise network) connecting to the Internet via the ML server. In some cases, the ML server can be a proxy server. In some implementations, when in the training phase, the network system can be running in a controlled environment. For example, all outbound requests during the training phase are considered as normal requests.

At 304, data associated with normal network traffic through the ML server during the training phase is collected by the ML server. In some implementations, the normal network traffic can include one or more outbound requests that are normal requests. In some cases, the collected data can include at least one of a port number (e.g., port 443 or port 80), an action (e.g., POST or GET), and a web address. In some implementations, the collected data can include bi-directional network traffic data (e.g., outbound requests and inbound requests). The collected data can be stored locally in the ML server, or remotely to the ML server.

At 306, a classification model is generated based on the collected data by the ML server. The classification model can be generated using any suitable machine learning method (such as, Bayesian analysis and Markovian discrimination). In some implementations, the ML server can transmit to a second server a configuration file comprising the generated classification model. The second server can be either a backup of the ML server, or a part of a distributed system. For example, the distributed system can include both the ML server and the second server, and can deliver an outbound request filtering functionality. In some cases, the second server can provide the outbound request filtering functionality after receiving the generated classification model from the ML server. In other words, the second server can perform functions similar to those described in, for example, steps 308, 310, and 312 below.

At 308, the ML server switches the training phase to an active phase. When in the active phase, the network system can be running in a normal environment. For example, outbound requests during the active phase can include normal requests as well as abnormal requests (e.g., anomalous requests). In some implementations, the training phase can be automatically or manually switched to the active phase after being in the training phase for a configured time period (e.g., 1 hour under heavy traffic load, or 5 hours under light traffic load). In some cases, the configured time period can be determined based on the volume and/or regularity of network traffic. In some cases, the training phase can be automatically or manually switched to the active phase when an amount of the collected data is greater than a predetermined threshold (e.g., 10 MB). In some cases, the predetermined threshold can be determined based on, for example, one of the classification model and the number of functionalities the ML server providing (e.g., the number of devices the ML server serving).

At 310, during the active phase, an outbound request is received by the ML server. In some implementations, the received outbound request can be a normal request. In some cases, the received outbound request can be an abnormal request that is associated with a sudden change of network traffic or associated with a covert channel.

At 312, a determination is made, by the ML server, as to whether the outbound request is an anomalous request. In some implementations, a confidence value can be generated, by the ML server, based on the outbound request and the classification model. For example, the confidence value can be generated based on a similarly between the outbound request and one or more data entries in the classification model. A determination can be made, by the ML server, as to whether the confidence value exceeds a configured threshold. If it is determined that the confidence value exceeds the configured threshold, the ML server can determine that the outbound request is an anomalous request. Otherwise, if it is determined that the confidence value does not exceed the configured threshold, the ML server can determine that the outbound request is not an anomalous request. For example, a confidence value can be generated with a value between 0 and 1. When the confidence value is 0, the ML server is confident that the outbound request is a normal request. When the confidence value is 1, the ML server is confident that the outbound request is an anomalous request. When the confidence value is between 0 and 1, a threshold can be configured to, for example, 0.8 to be used for the determination. In some cases, a threshold for blocking the request can be set to 0.95, while a threshold for alerting an administrator but allowing the request to pass can be set to 0.8.

In some implementations, in response to a determination that the outbound request is not an anomalous request, the ML server can pass the outbound request to its destination. In some cases, in response to a determination that the outbound request is an anomalous request, the ML server can generate an alert indicating that an anomalous request has been detected. The outbound request can be blocked by the ML server if it is determined to be an anomalous request. In some implementations, during the active phase, the ML server can, for example, detect that a software update has been completed. In response to the detection, the ML server can switch the active phase to the training phase to retrain the classification model (e.g., repeating previously described steps 304 and 306).

Figure 4:
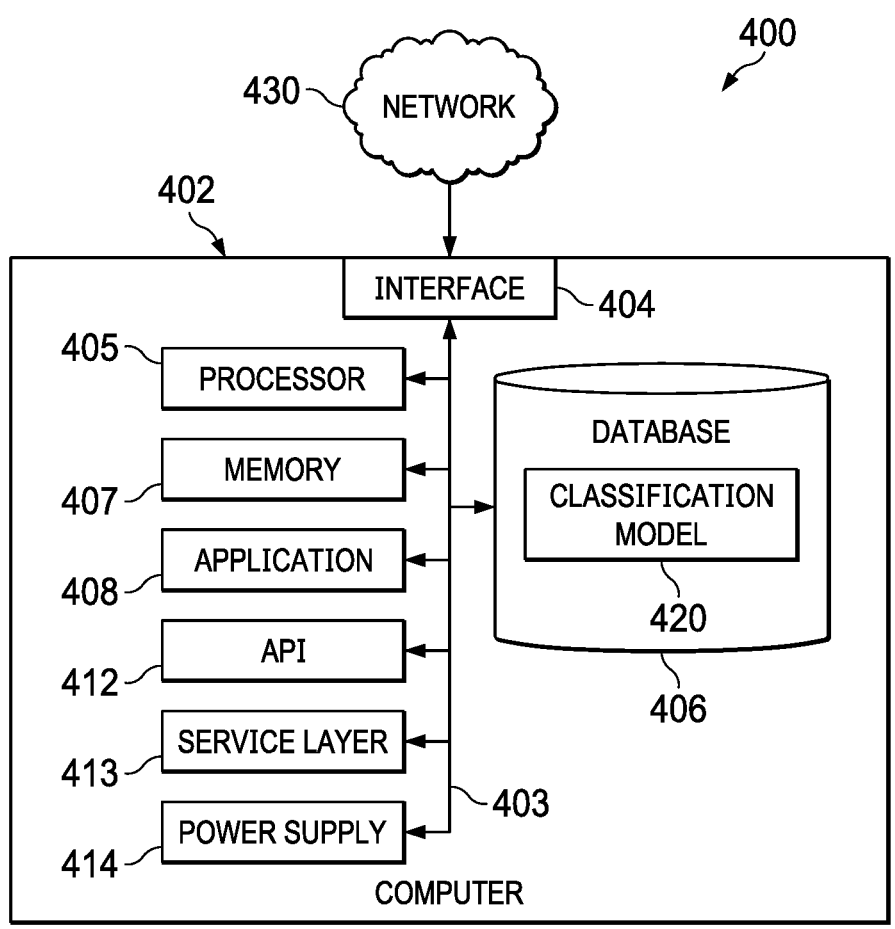
FIG. 4 is a block diagram of an example computer system used to provide computational functionalities associated with described algorithms, methods, functions, processes, flows, and procedures, as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical-type user interface (UI) (or GUI).

The computer 402 can serve in a role as a client, network component, a server, a database or other persistency, or any other component (or a combination of roles) of a computer system for performing the subject matter described in the instant disclosure. For example, the computer 402 can be used to implement computing devices such as any one of the network device 102, the ML server 104, the network node 106, the device 202, the ML log monitor 204, and the external monitoring endpoints 206 discussed previously. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described classification model 420.

The computer 402 also includes a memory 407 that can hold data for the computer 402 or other components (or a combination of both) that can be connected to the network 430 (whether illustrated or not). Memory 407 can store any data consistent with this disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:
    initiating, by a machine learning (ML) server, a training phase;
    collecting, by the ML server and during the training phase, data associated with normal network traffic through the ML server;
    generating, by the ML server, a classification model based on the collected data;
    switching, by the ML server, from the training phase to an active phase;
    receiving, by the ML server and during the active phase, an outbound request;
    determining, by the ML server, whether the outbound request is an anomalous request based on the classification model;
    detecting, by the ML server, a completion of a software update in a communication network system that is monitored by the ML server during the active phase; and
    in response to detecting the completion of the software update in the communication network system, switching, by the ML server, from the active phase to the training phase.

2. The method of claim 1, wherein the ML server transmits to a second server a configuration file comprising the classification model based on the collected data, the second server being either a backup of the ML server, or a part of a distributed system, the distributed system comprising the ML server and the second server, and the distributed system delivering an outbound request filtering functionality.

3. The method of claim 1, wherein the normal network traffic includes one or more outbound requests that are normal requests.

4. The method of claim 1, wherein the collected data includes at least one of a port number, an action, and a web address.

5. The method of claim 1, wherein the received outbound request is associated with a sudden change of network traffic or associated with a covert channel.

6. The method of claim 1, wherein the training phase is automatically or manually switched to the active phase after a configured time period.

7. The method of claim 1, wherein the training phase is automatically or manually switched to the active phase when an amount of the collected data is greater than a predetermined threshold.

8. The method of claim 1, wherein determining, by the ML server, whether the outbound request is an anomalous request based on the classification model comprises:

generating, by the ML server, a confidence value based on the outbound request and the classification model;

determining, by the ML server, whether the confidence value exceeds a configured threshold;

if the confidence value exceeds the configured threshold, determining, by the ML server, that the outbound request is an anomalous request; and if the confidence value does not exceed the configured threshold, determining, by the ML server, that the outbound request is not an anomalous request.

9. The method of claim 1, further comprising:

in response to determining that the outbound request is an anomalous request:

generating, by the ML server, an alert indicating that the anomalous request has been detected; and blocking, by the ML server, the outbound request.

10. A non-transitory computer-readable medium storing one or more instructions executable by a computer system to perform operations comprising:

initiating, by a machine learning (ML) server, a training phase;

collecting, by the ML server and during the training phase, data associated with normal network traffic through the ML server;

generating, by the ML server, a classification model based on the collected data;

switching, by the ML server, from the training phase to an active phase;

receiving, by the ML server and during the active phase, an outbound request;

determining, by the ML server, whether the outbound request is an anomalous request based on the classification model;

detecting, by the ML server, a completion of a software update in a communication network system that is monitored by the ML server during the active phase; and in response to detecting the completion of the software update in the communication network system, switching, by the ML server, from the active phase to the training phase.

11. The non-transitory computer-readable medium of claim 10, wherein the ML server transmits to a second server a configuration file comprising the classification model based on the collected data, the second server being either a backup of the ML server, or a part of a distributed system, the distributed system comprising the ML server and the second server, and the distributed system delivering an outbound request filtering functionality.

12. The non-transitory computer-readable medium of claim 10, wherein the normal network traffic includes one or more outbound requests that are normal requests.

13. The non-transitory computer-readable medium of claim 10, wherein the collected data includes at least one of a port number, an action, and a web address.

14. The non-transitory computer-readable medium of claim 10, wherein the received outbound request is associated with a sudden change of network traffic or associated with a covert channel.

15. The non-transitory computer-readable medium of claim 10, wherein the training phase is automatically or manually switched to the active phase after a configured time period.

16. The non-transitory computer-readable medium of claim 10, wherein the training phase is automatically or manually switched to the active phase when an amount of the collected data is greater than a predetermined threshold.

17. The non-transitory computer-readable medium of claim 10, wherein determining, by the ML server, whether the outbound request is an anomalous request based on the classification model comprises:

generating, by the ML server, a confidence value based on the outbound request and the classification model;

determining, by the ML server, whether the confidence value exceeds a configured threshold;

if the confidence value exceeds the configured threshold, determining, by the ML server, that the outbound request is an anomalous request; and if the confidence value does not exceed the configured threshold, determining, by the ML server, that the outbound request is not an anomalous request.

18. The non-transitory computer-readable medium of claim 10, the operations further comprising:

in response to determining that the outbound request is an anomalous request:

generating, by the ML server, an alert indicating that the anomalous request has been detected; and blocking, by the ML server, the outbound request.

19. A computer-implemented system, comprising:

one or more computers; and one or more computer memory devices interoperably coupled with the one or more computers and having machine-readable media storing one or more instructions that, when executed by the one or more computers, perform one or more operations comprising:

initiating, by a machine learning (ML) server, a training phase;

collecting, by the ML server and during the training phase, data associated with normal network traffic through the ML server;

generating, by the ML server, a classification model based on the collected data;

switching, by the ML server, from the training phase to an active phase;

receiving, by the ML server and during the active phase, an outbound request;

determining, by the ML server, whether the outbound request is an anomalous request based on the classification model;

detecting, by the ML server, a completion of a software update in a communication network system that is monitored by the ML server during the active phase; and in response to detecting the completion of the software update in the communication network system, switching, by the ML server, from the active phase to the training phase.

* * * * *